US012578019B2

(12) United States Patent
Akagami et al.

(10) Patent No.: US 12,578,019 B2
(45) Date of Patent: Mar. 17, 2026

(54) SLIDING COMPONENT

(71) Applicant: EAGLE INDUSTRY CO., LTD.,
Tokyo (JP)

(72) Inventors: Kenta Akagami, Tokyo (JP); Takuto Fukuhara, Tokyo (JP); Koshi Adachi, Miyagi (JP)

(73) Assignee: EAGLE INDUSTRY CO., LTD.,
Tokyo (JP)

( * ) Notice: Subject to any disclaimer, the term of this patent is extended or adjusted under 35 U.S.C. 154(b) by 0 days.

(21) Appl. No.: 18/871,420

(22) PCT Filed: Jun. 7, 2023

(86) PCT No.: PCT/JP2023/021113
§ 371 (c)(1),
(2) Date: Dec. 3, 2024

(87) PCT Pub. No.: WO2023/238883
PCT Pub. Date: Dec. 14, 2023

(65) Prior Publication Data
US 2025/0354609 A1 Nov. 20, 2025

(30) Foreign Application Priority Data
Jun. 7, 2022 (JP) ................................. 2022-092385

(51) Int. Cl.
*F16J 15/34* (2006.01)
(52) U.S. Cl.
CPC ................................. *F16J 15/3416* (2013.01)

(58) Field of Classification Search
CPC .... F16J 15/3412; F16J 15/3416; F16J 15/342; F16J 15/3424
See application file for complete search history.

(56) References Cited

U.S. PATENT DOCUMENTS

| | | | | |
|---|---|---|---|---|
| 2,247,505 A | | 7/1941 | Kohler | F16J 15/342 |
| 3,147,013 A | | 9/1964 | Tracy | F04D 29/126 |
| 3,804,424 A | * | 4/1974 | Gardner | F16J 15/3412 |
| | | | | 277/400 |
| 3,957,276 A | | 5/1976 | Wiese | F16J 15/3412 |
| 5,174,584 A | * | 12/1992 | Lahrman | F01D 11/003 |
| | | | | 277/400 |
| 6,152,452 A | | 11/2000 | Wang | 277/400 |
| 6,485,021 B1 | | 11/2002 | Osaki | F16J 15/3412 |
| 7,258,346 B2 | | 8/2007 | Tejima | F16J 15/3412 |
| 7,744,094 B2 | * | 6/2010 | Yanagisawa | F16J 15/342 |
| | | | | 277/408 |
| 8,888,104 B2 | * | 11/2014 | Garrison | F16J 9/24 |
| | | | | 277/306 |

(Continued)

FOREIGN PATENT DOCUMENTS

| | | |
|---|---|---|
| JP | 2019-108921 A2 | 7/2019 |
| JP | 2020-153469 A2 | 9/2020 |

*Primary Examiner* — Nicholas L Foster
(74) *Attorney, Agent, or Firm* — HAYES SOLOWAY P.C.

(57) ABSTRACT

There is provided a sliding component capable of effectively retaining a fine wear product in a recessed strip portion. In a sliding component that is disposed at a location of relative rotation of a rotating machine and that slides relative to a counterpart sliding member, a recessed strip portion is formed on a sliding surface of the sliding component, and the recessed strip portion is provided with a step having a difference in height, which traps a wear product.

11 Claims, 15 Drawing Sheets

(56) References Cited

U.S. PATENT DOCUMENTS

| | | | | |
|---|---|---|---|---|
| 9,353,867 B2 | 5/2016 | Itadani et al. | ....... | F16J 15/3448 |
| 9,574,667 B2* | 2/2017 | Takahashi | ............ | F16J 15/3448 |
| 9,714,712 B2 | 7/2017 | Kiernan | .............. | F16J 15/3412 |
| 10,690,249 B2* | 6/2020 | Tebby | ................... | F04D 29/026 |
| 10,808,752 B2* | 10/2020 | Itadani | .................... | F16C 17/12 |
| 11,009,072 B2 | 5/2021 | Kimura et al. | .......... | F16J 15/34 |
| 11,248,706 B2* | 2/2022 | Imura | .................... | F16C 33/74 |
| 11,320,052 B2* | 5/2022 | Imura | ................. | F16J 15/3424 |
| 11,619,308 B2* | 4/2023 | Imura | ................. | F16J 15/3412 |
| | | | | 277/447 |
| 11,692,628 B2* | 7/2023 | Liang | .................... | F16J 15/002 |
| | | | | 277/400 |
| 2005/0094906 A1 | 5/2005 | Satoh | ................... | F16C 17/045 |
| 2007/0296156 A1* | 12/2007 | Yanagisawa | ......... | F16J 15/3412 |
| | | | | 277/352 |
| 2013/0200573 A1* | 8/2013 | Garrison | ............... | F16J 15/342 |
| | | | | 137/1 |
| 2013/0209011 A1 | 8/2013 | Tokunaga | ............ | F16J 32/0633 |
| 2014/0197600 A1 | 7/2014 | Hosoe et al. | ............ | F16J 15/40 |
| 2015/0377360 A1 | 12/2015 | Itadani et al. | ....... | F16J 15/3488 |
| 2016/0003361 A1* | 1/2016 | Takahashi | ............ | F16J 15/3448 |
| | | | | 277/377 |
| 2016/0172062 A1* | 6/2016 | Tebby | ....................... | F16J 15/34 |
| | | | | 277/300 |
| 2017/0002930 A1 | 1/2017 | Itadani et al. | ....... | F16J 15/3412 |
| 2017/0102074 A1 | 4/2017 | Itadani et al. | .......... | F16J 15/34 |
| 2017/0138482 A1 | 5/2017 | Inoue et al. | | |
| 2018/0073394 A1 | 3/2018 | Tokunaga | ............ | F16J 15/3412 |
| 2018/0195618 A1 | 7/2018 | Itadani | ................... | F16J 15/342 |
| 2019/0264737 A1* | 8/2019 | Itadani | ................. | F16C 33/741 |
| 2021/0041026 A1* | 2/2021 | Imura | .................. | F16J 15/3424 |
| 2021/0048106 A1* | 2/2021 | Imura | ................. | F16J 15/3424 |
| 2021/0080009 A1 | 3/2021 | Kimura | ............... | F16J 15/3412 |
| 2022/0099188 A1 | 3/2022 | Imura et al. | ........ | F16J 15/3412 |
| 2022/0099191 A1 | 3/2022 | Suzuki | .................. | F16C 33/103 |
| 2022/0106980 A1 | 4/2022 | Imura et al. | .......... | F16C 17/026 |
| 2022/0120315 A1 | 4/2022 | Ou | ........................ | F16C 17/045 |
| 2022/0128088 A1 | 4/2022 | Suzuki | .................. | F16C 33/107 |
| 2022/0128150 A1* | 4/2022 | Liang | .................... | F16J 15/342 |
| 2022/0145992 A1* | 5/2022 | Miyazaki | ............. | F16C 33/107 |
| 2022/0268361 A1* | 8/2022 | Imura | ................. | F16J 15/3424 |

* cited by examiner (a)

(b)

(a)

(b)

(a)

(b)

(a)

(b)

( a )

( b )

(a)

300

(b)

301

(c)

302

(d)

303

(a)

(b)

(c)

(d)

(e)

(f)

(a)

(b)

(c)

ROTATION DIRECTION
OF ROTATING SEAL RING (F)

510

(A)

O

514

514a

L

L

K

K

512

515

511

(a)

(b)

SLIDING COMPONENT

TECHNICAL FIELD

The present invention relates to a sliding component used as one of sliding components that rotate relative to each other, for example, sliding components used in a shaft sealing device that seals a rotating shaft of a rotating machine in an automobile, a general industrial machine, or other seal fields, or sliding components used in a bearing of a machine in an automobile, a general industrial machine, or other bearing fields.

BACKGROUND ART

For example, a mechanical seal as a shaft sealing device that prevents a leakage of a sealed fluid includes a pair of sliding components having an annular shape which rotate relative to each other and of which sliding surfaces slide on each other. In such a mechanical seal, in recent years, there has been a desire to reduce the loss of energy due to sliding for environmental measures and the like. Therefore, for example, by allowing liquid to flow to a gap between sliding surfaces of the sliding components and forming a fluid film between the sliding surfaces, lubricity may be improved and low friction may be realized.

For example, the following is described in Patent Citation 1. A sliding surface of one sliding component of a mechanical seal includes a plurality of very small recessed strip portions provided at a predetermined pitch width, and deep groove portions provided across the plurality of recessed strip portions and deeper than the recessed strip portions. During relative rotation between the pair of sliding components, protruding strip portions of curved surfaces which are top portions between the recessed strip portions slide on the other sliding surface, fine wear products are generated, the fine wear products are firmly fixed between the protruding strip portions and the other sliding surface to form a transfer layer, and the fine wear products are collected in the recessed strip portions. The formation of the transfer layer promotes a transition from severe wear to mild wear between the sliding surfaces during relative rotation. Further, excess wear products are discharged into the deep grooves.

Incidentally, the severe wear is wear in which the amount of wear increases as the sliding distance increases, and the mild wear is wear in which the amount of wear hardly increases even when the sliding distance increases. In addition, a wear rate of the mild wear is ¹⁄₁₀ to ¹⁄₁₀₀₀ of a wear rate of the severe wear.

CITATION LIST

Patent Literature

Patent Citation 1: JP 2019-108921 A (Page 5, FIG. 1)

SUMMARY OF INVENTION

Technical Problem

In the sliding components as in Patent Citation 1, fine wear products are easily generated by forming the top portions of the protruding strip portions as curved surfaces, and the transfer layer is easily formed between the protruding strip portions and the other sliding surface. However, since the fine wear products move along the recessed strip portions, the fine wear products are easily discharged to the outside of sliding regions through the deep groove portions, and since the fine wear products cannot be effectively retained in the recessed strip portions, for example, it takes time for the fine wear products to form the transfer layer, which is a risk.

The present invention has been made in view of such problems, and an object of the present invention is to provide a sliding component capable of effectively retaining fine wear products in a recessed strip portion.

Solution to Problem

In order to solve the foregoing problems, a sliding component according to the present invention is a sliding component that is disposed at a location of relative rotation of a rotating machine and that slides relative to a counterpart sliding member. A recessed strip portion is formed on a sliding surface of the sliding component, and the recessed strip portion is provided with a step having a difference in height, which traps a wear product. According to the aforesaid feature of the present invention, since the wear product flowing along the recessed strip portion is trapped and deposited by the step of the recessed strip portion, the fine wear product can be effectively retained in the recessed strip portion as a lubricant.

It may be preferable that a plurality of the recessed strip portions are independently provided in a radial direction. According to this preferable configuration, since the recessed strip portion is not in communication with an external space, the discharge of the wear product from the recessed strip portion to the external space can be suppressed. In addition, since a force that occurs in the recessed strip portion during relative rotation between sliding surfaces acts evenly in the radial direction, the sliding surfaces are easily kept substantially parallel to each other.

It may be preferable that the recessed strip portion has an endless annular shape. According to this preferable configuration, the wear product circulating around the recessed strip portion is easily trapped by the step. In addition, since a force that occurs in the recessed strip portion during relative rotation between sliding surfaces acts evenly in a circumferential direction, the sliding surfaces are easily kept substantially parallel to each other.

It may be preferable that a bottom portion of the recessed strip portion is curved to be further recessed in a recess direction of the recessed strip portion. According to this preferable configuration, the wear product moving along the bottom portion of the recessed strip portion is easily guided to the step.

It may be preferable that a plurality of the steps are disposed spaced apart from each other in a longitudinal direction of the recessed strip portion. According to this preferable configuration, the wear product can be deposited in the longitudinal direction of the recessed strip portion in a well-balanced manner while securing a wear section of the sliding surface.

It may be preferable that a dimple is disposed on a bottom portion of the recessed strip portion, and a part of the dimple forms the step. According to this preferable configuration, a large space for accommodating the fine wear product can be secured by the dimple. In addition, the step can be easily formed.

It may be preferable that the dimple has a circular shape when viewed in an axial direction. According to this preferable configuration, the wear product is easily trapped in the dimple.

It may be preferable that the sliding component is made of SiC. According to this preferable configuration, since SiC has high hydrophilicity and the surface area of the wear product is wide, water can be suitably held around the recessed strip portion or the step.

DESCRIPTION OF EMBODIMENTS

Figure 1:
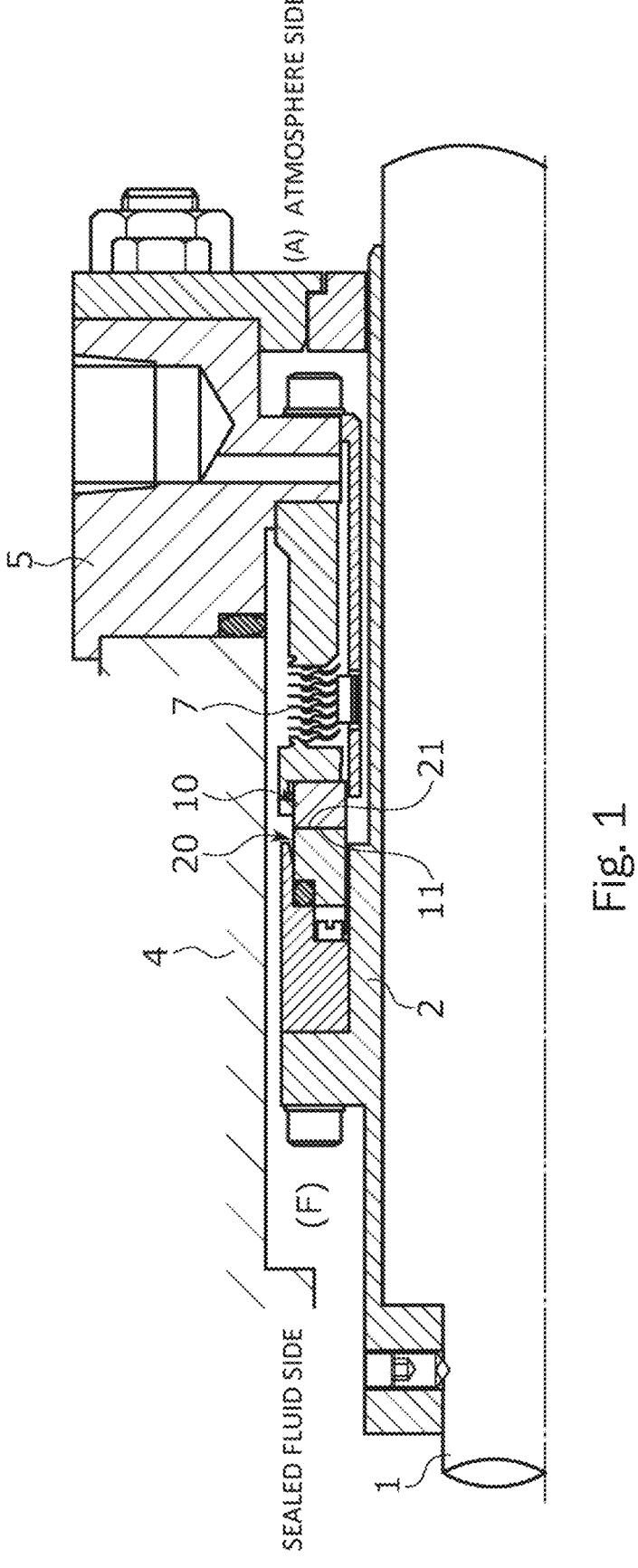
FIG. 1 is a longitudinal sectional view illustrating one example of a mechanical seal including a sliding component according to a first embodiment of the present invention.

Modes for implementing sliding components according to the present invention will be described below based on embodiments.

First Embodiment

A sliding component according to a first embodiment of the present invention will be described with reference to FIGS. 1 to 7. Incidentally, in the present embodiment, a mode in which the sliding components form a mechanical seal will be described as an example. In addition, a description will be made based on the assumption that a radially outer side of the sliding components forming a mechanical seal is a sealed fluid side (high-pressure side) and a radially inner side is an atmosphere side (low-pressure side) as a leakage side. In addition, for convenience of description, in the drawings, dots may be added to grooves and the like formed on a sliding surface.

The mechanical seal illustrated in FIG. 1 is used, for example, in a shaft sealing device for a motor cooling system of an electric vehicle, and is an inside mechanical seal that seals a sealed fluid F tending to leak from the radially outer side toward the radially inner side of the sliding surface. Incidentally, in the present embodiment, a mode in which the sealed fluid F is cooling water will be provided as an example.

The mechanical seal mainly includes a rotating seal ring 20 as a counterpart sliding member that is an annular sliding component provided on a rotating shaft 1 via a sleeve 2 to be rotatable integrally with the rotating shaft 1, and a stationary seal ring 10 having an annular shape which is a sliding component provided on a seal cover 5 fixed to a housing 4 of an attached device to be non-rotatable and movable in an axial direction. The stationary seal ring 10 is biased in the axial direction by a bellows 7, so that a sliding surface 11 of the stationary seal ring 10 and a sliding surface 21 of the rotating seal ring 20 slide in close contact with each other. Incidentally, the sliding surface 21 of the rotating seal ring 20 is a flat surface, and a recessed portion is not provided on the flat surface.

The stationary seal ring 10 and the rotating seal ring 20 are typically made of SiC (as an example of hard material) or a combination of SiC and carbon (as an example of soft material), but are not limited thereto, and any sliding material can be applied as long as the sliding material is used as a sliding material for a mechanical seal. Incidentally, examples of SiC include sintered bodies using boron, aluminum, carbon, or the like as a sintering aid, and materials consisting of two or more phases with different components and compositions, such as SiC in which graphite particles are dispersed, reaction-sintered SiC consisting of SiC and Si, SiC—TiC, and SiC—TiN. As the carbon, carbon in which a carbonaceous substance and a graphitic substance are mixed, resin-molded carbon, sintered carbon, and the like can be used. In addition, in addition to the above-described sliding materials, metal materials, resin materials, surface modification materials (e.g., coating materials), composite materials, and the like can also be applied. As will be described later, a material containing SiC as a main component is preferable from the viewpoint of water retention.

Figure 2:
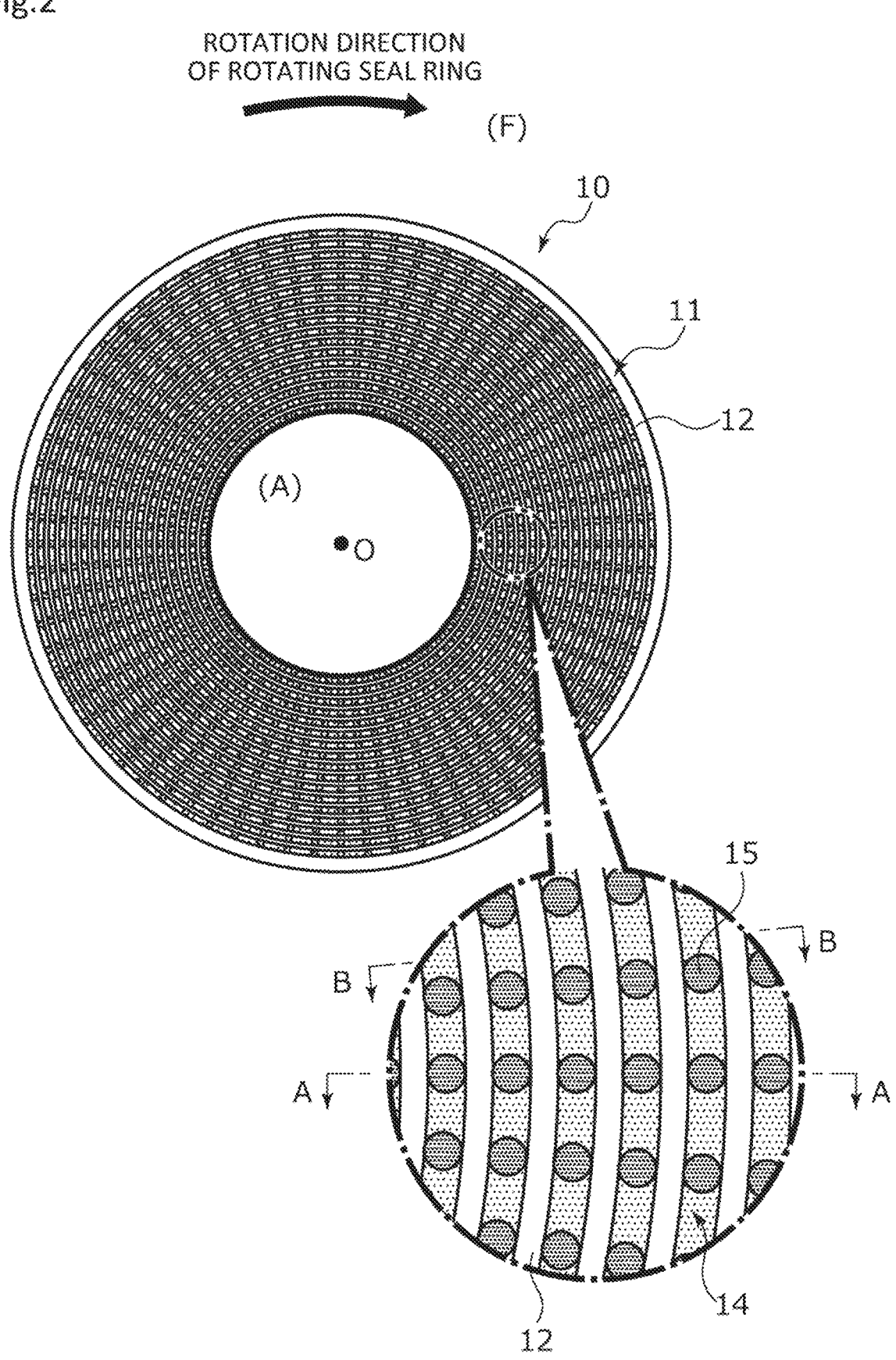
FIG. 2 is a view of a sliding surface of a stationary seal ring when viewed in an axial direction.

As illustrated in FIG. 2, the rotating seal ring 20 slides relative to the stationary seal ring 10 as indicated by an arrow. A plurality of recessed strip grooves 14 are provided on the sliding surface 11 of the stationary seal ring 10 as recessed strip portions. Portions of the sliding surface 11 other than the recessed strip grooves 14 are lands 12, and the recessed strip grooves 14 and the lands 12 are alternately disposed in a radial direction.

Figure 3:
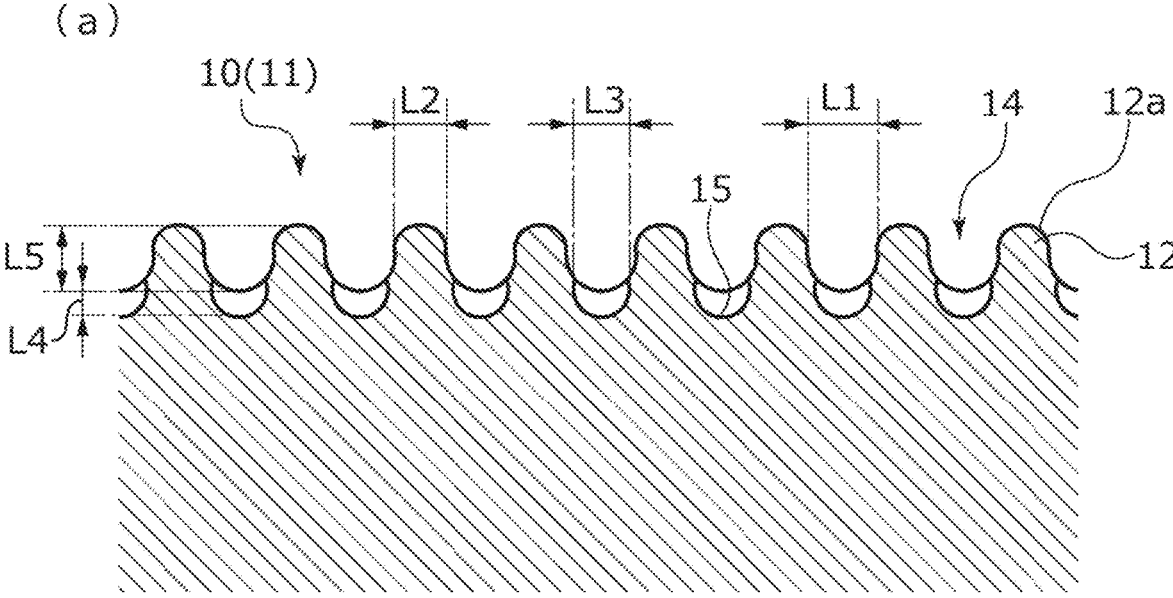
FIG. 3A is a cross-sectional view taken along line A-A of FIG. 2.
FIG. 3B is a cross-sectional view taken along line B-B of FIG. 2.
Figure 3:
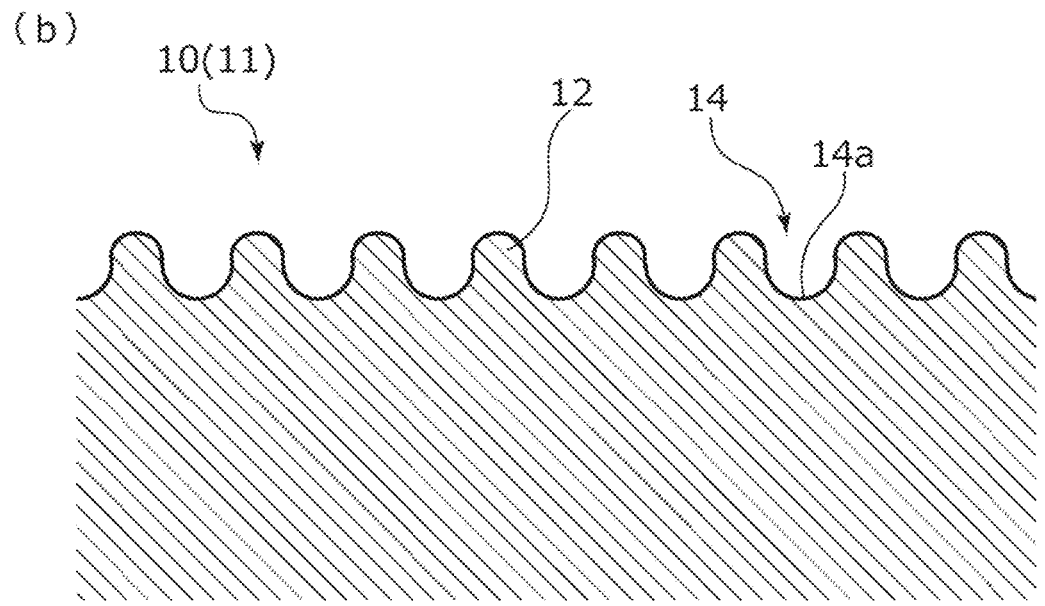

As illustrated in FIGS. 2 and 3, the plurality of recessed strip grooves 14 have an endless annular shape, and are provided concentrically with the sliding surface 11 while being spaced apart from each other at a predetermined pitch width in the radial direction. Namely, the plurality of recessed strip grooves 14 are independently provided in the radial direction, and the recessed strip grooves are not in communication with each other. Each recessed strip groove 14 has a width dimension L1 in the radial direction. In addition, the recessed strip groove 14 has a constant depth dimension L5 in a circumferential direction and the radial direction. Incidentally, for convenience of description, the depth of the recessed strip groove 14 or the depth of a dimple 15 to be described later is illustrated to be deeper and schematically than the actual depth.

A width dimension L2 of the land 12 in the radial direction is slightly smaller than the width dimension L1 of the recessed strip groove 14 in the radial direction (L1>L2). Incidentally, in the present embodiment, a mode in which the width dimension L2 of the land 12 is smaller than the width dimension L1 of the recessed strip groove 14 has been provided as an example; however, the width of the land between the recessed strip grooves may be larger than the width of the recessed strip groove, or the width of the land and the width of the recessed strip groove may be the same. From the viewpoint of forming a plateau layer 16 to be described later, it is preferable that the width dimension L1 of the land is larger than $\frac{1}{3}$ times and smaller than 3 times the width dimension L2 of the recessed strip groove ($\frac{1}{3}L2<L1<3L2$).

In addition, a top portion 12a of the land 12 is curved to protrude toward a rotating seal ring 20 side.

A bottom portion 14a of the recessed strip groove 14 is curved in a recess direction, namely, a direction opposite to an end surface of the land 12 (namely, downward in FIG. 3).

A plurality of the dimples 15 are evenly disposed spaced apart from each other in a longitudinal direction of the recessed strip groove 14, namely, the circumferential direction on the bottom portion 14a of the recessed strip groove 14. The dimples 15 are disposed radially from a relative rotation center O of the sliding surface 11 when viewed in the axial direction. Each dimple 15 has a hemispherical shape that is open to the recessed strip groove 14, and has an upward facing C-shaped cross section and a circular shape when viewed in the axial direction.

A radial dimension L3 of the dimple 15 is slightly smaller than the width dimension L1 of the recessed strip groove 14 (L1>L3). Incidentally, the radial dimension L3 of the dimple 15 may be the same as the width dimension L1 of the recessed strip groove 14 or may be larger than the width dimension L1 of the recessed strip groove 14; however, from the viewpoint of forming the plateau layer 16 to be described later, it is preferable that the radial dimension L3 of the dimple 15 is larger than $\frac{1}{3}$ times the width dimension L1 of the recessed strip groove 14 and less than or equal to the width dimension L1 of the recessed strip groove 14 ($\frac{1}{3}L1<L3\leq L1$).

In addition, a depth dimension L4 of the dimple 15 is smaller than the depth dimension L5 of the recessed strip groove 14 (L4<L5). Incidentally, the depth dimension L4 of the dimple 15 may be the same as the depth dimension L5 of the recessed strip groove 14 or may be larger than the depth dimension L5 of the recessed strip groove 14; however, from the viewpoint of forming the plateau layer 16 to be described later, it is preferable that the depth dimension L4 is larger than $\frac{1}{3}$ times and smaller than 3 times the depth dimension L5 of the recessed strip groove 14 ($\frac{1}{3}L5<L4\leq 3L5$).

The stationary seal ring 10 of the present embodiment is configured by forming the recessed strip grooves 14 on the sliding surface 11 and then forming the dimples 15 on the bottom portions 14a of the recessed strip grooves 14. Incidentally, after the dimples 15 are formed on the sliding surface 11, the recessed strip grooves 14 may be formed.

Next, the operation during relative rotation between the stationary seal ring 10 and the rotating seal ring 20 in a break-in operation performed before the normal operation of the mechanical seal will be described using FIGS. 4 to 6. Incidentally, in FIGS. 4 to 6, the movement of the sealed fluid F or wear products 30 in one recessed strip groove 14 will be described. Furthermore, in FIGS. 4 to 6, a change in height due to wear of the lands 12 is illustrated to be larger than the actual change.

First, during non-operation in which the rotating seal ring 20 is not in rotation, the sealed fluid F is stored in the recessed strip groove 14. Incidentally, since the stationary seal ring 10 is biased toward the rotating seal ring 20 side by the bellows 7, there is substantially no leakage from between the sliding surfaces 11 and 21 to the low-pressure side.

Figure 4:
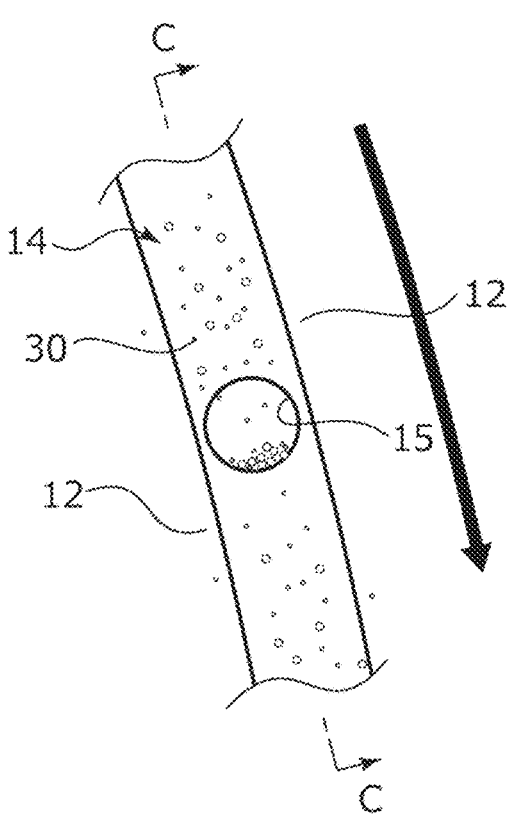
FIG. 4A is a schematic view illustrating the state of one recessed groove during relative rotation between sliding components when viewed in the axial direction.
FIG. 4B is a cross-sectional view taken along line C-C of FIG. 4A.
Figure 4:
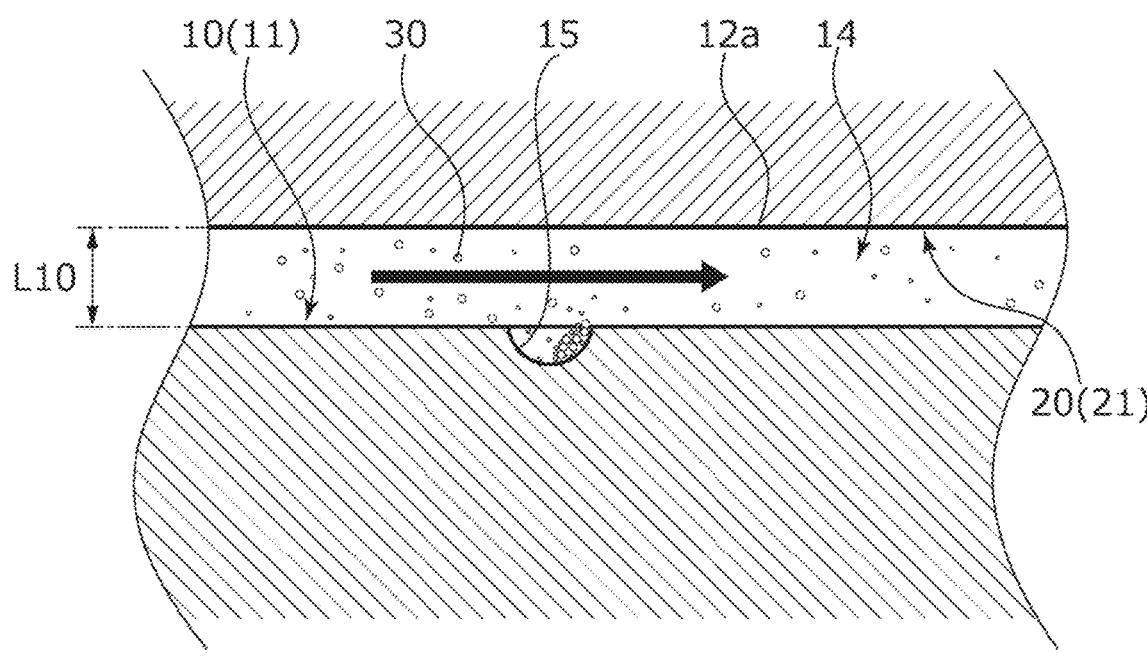

As illustrated in FIG. 4, when the rotating seal ring 20 rotates relative to the stationary seal ring 10, the sealed fluid F stored in the recessed strip groove 14 follows and moves in a rotation direction (refer to an arrow) of the rotating seal ring 20 due to friction with the sliding surface 21. Specifically, the sealed fluid F moves along the recessed strip groove 14 extending along a relative rotation direction of the rotating seal ring 20. Incidentally, the height of the land 12 in the state in FIG. 4 is a dimension L10.

In this case, the land 12 of the stationary seal ring 10 and the flat surface of the sliding surface 21 of the rotating seal ring 20 come into local contact with each other, so that the fine wear products 30 are generated. As described above, since the top portion 12a of the land 12 is curved to protrude toward the rotating seal ring 20 side, the formation of large wear products is suppressed. The wear products 30 may originate from the stationary seal ring 10, may originate from the rotating seal ring 20, or may be a mixture thereof.

The fine wear products 30 move along the recessed strip groove 14 together with the sealed fluid F. Some of the wear products 30 moving along the recessed strip groove 14 is trapped in the dimple 15. Specifically, a surface on a downstream side of the relative rotation, which forms the dimple 15, is disposed at a lower position than the bottom portion 14a of the recessed strip groove 14, and the surface traps the wear products 30.

Figure 7:
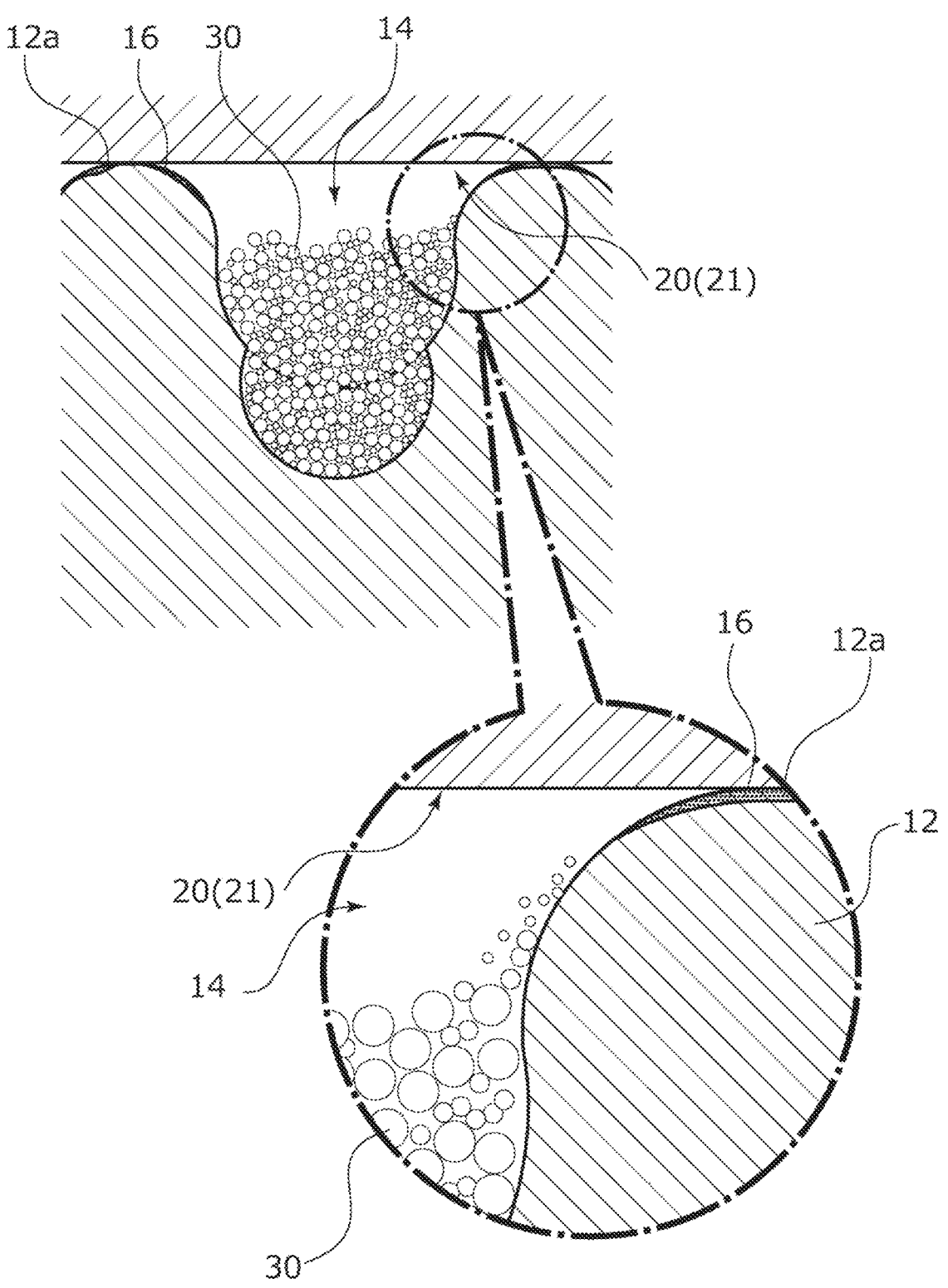
FIG. 7 is a cross-sectional view taken along line F-F of FIG. 6B.

In addition, due to sliding between the top portion 12a of the land 12 and the sliding surface 21 of the rotating seal ring 20, the unevenness of the top portion 12a of the land 12 is worn out and the plateau layer 16 is formed (refer to FIG. 7).

The plateau layer 16 has good break-in with the sliding surface 21, and can exhibit a low wear state.

Figure 5:
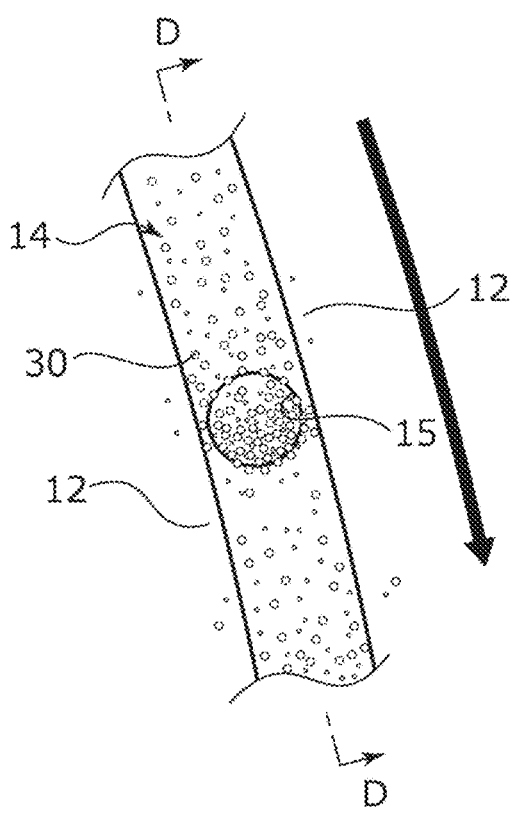
FIG. 5A is a schematic view illustrating a state where the relative rotation between the sliding components has further progressed than the state in FIG. 4 when viewed in the axial direction.
FIG. 5B is a cross-sectional view taken along line D-D of FIG. 5A.
Figure 5:
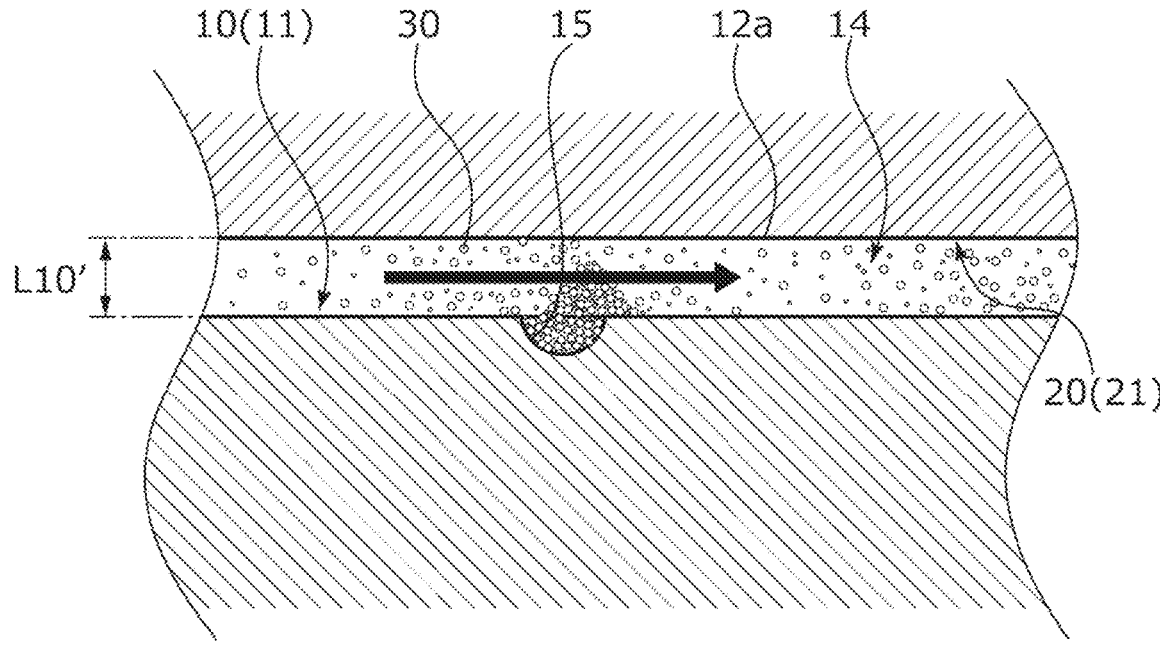

As illustrated in FIG. 5, when the rotating seal ring 20 further rotates relative to the stationary seal ring 10 from the state in FIG. 4, the wear products 30 are further trapped in the dimple 15.

In addition, the height of the land 12 in the state in FIG. 5 is a dimension L10' smaller than the dimension L10 due to wear (L10>L10').

Figure 6:
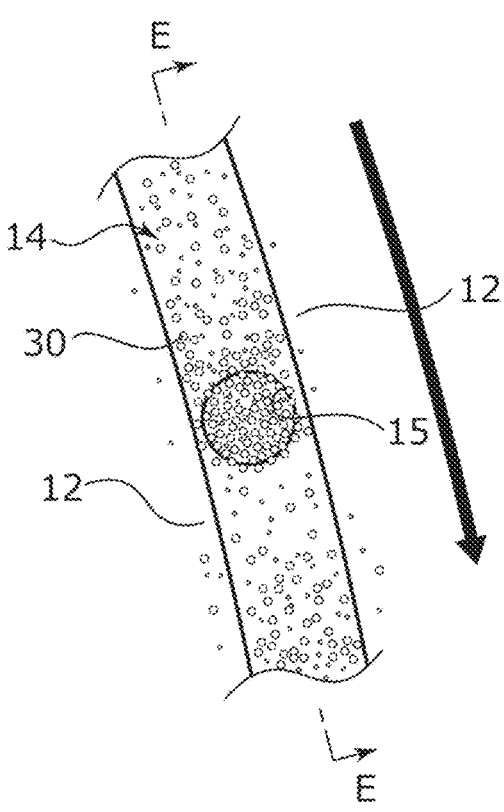
FIG. 6A is a schematic view illustrating a state where the relative rotation between the sliding components has further progressed than the state in FIG. 5 when viewed in the axial direction.
FIG. 6B is a cross-sectional view taken along line D-D of FIG. 6A.
Figure 6:
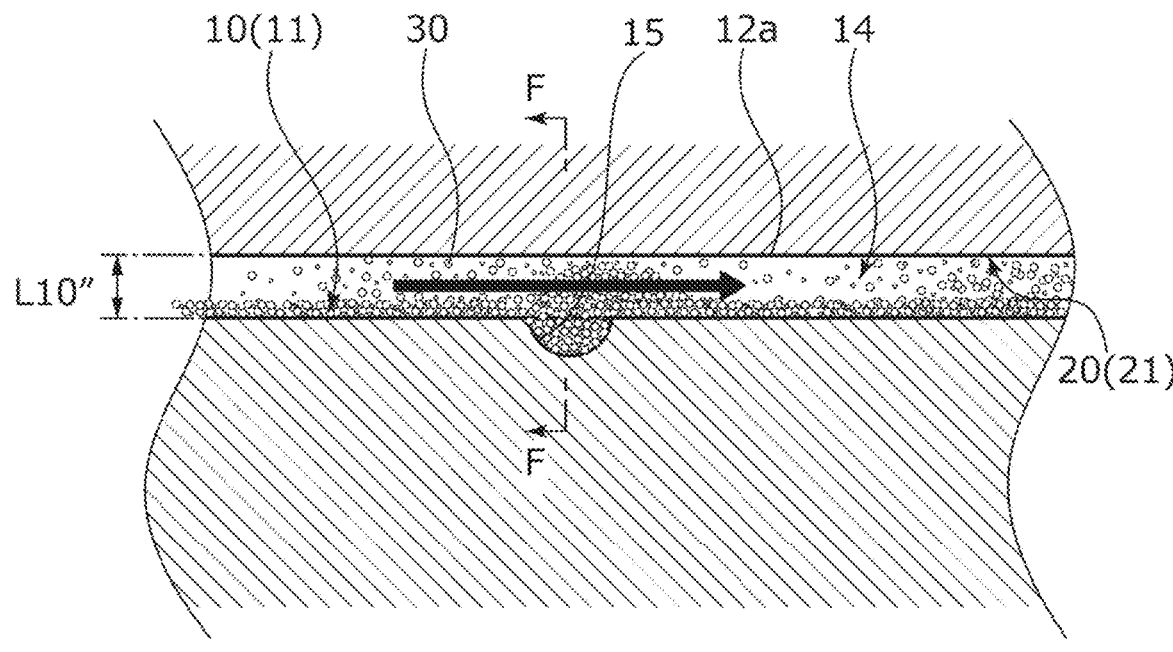

As illustrated in FIG. 6, when the rotating seal ring 20 further rotates relative to the stationary seal ring 10 from the state in FIG. 5, the wear products 30 are deposited in the dimple 15, and are deposited in layers on the bottom portion 14a of the recessed strip groove 14. Namely, a large amount of the wear products 30 exist around the bottom portion 14a of the recessed strip groove 14 or each dimple 15. Incidentally, the height of the land 12 in the state in FIG. 6 is a dimension L10" smaller than the dimension L10' (L10">L10").

The break-in operation is completed when a predetermined time elapses or the coefficient of friction becomes less than or equal to a predetermined value. In this completed state, the plateau layer 16 is sufficiently formed, and lubricity between the sliding surfaces 11 and 21 is good. Incidentally, the normal operation is performed after the break-in operation.

Figure 8:
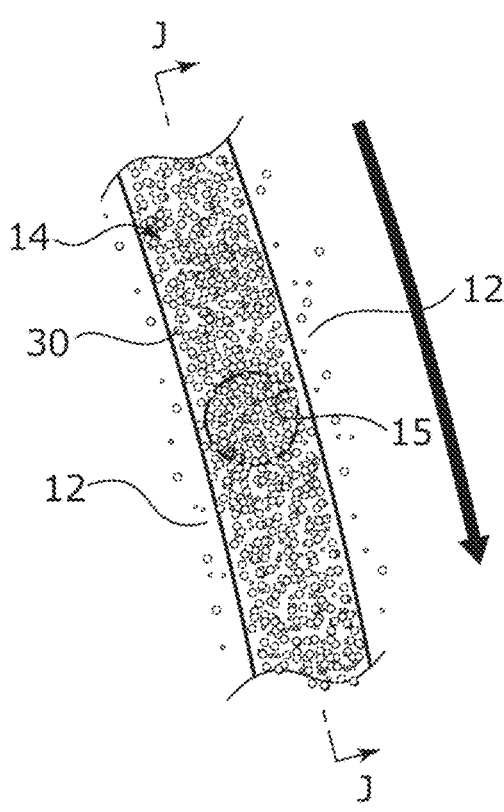
FIG. 8A is a schematic view illustrating one example of the state of one recessed groove during the normal operation of the mechanical seal for a long period of time when viewed in the axial direction.
FIG. 8B is a cross-sectional view taken along line J-J of FIG. 8A.
Figure 8:
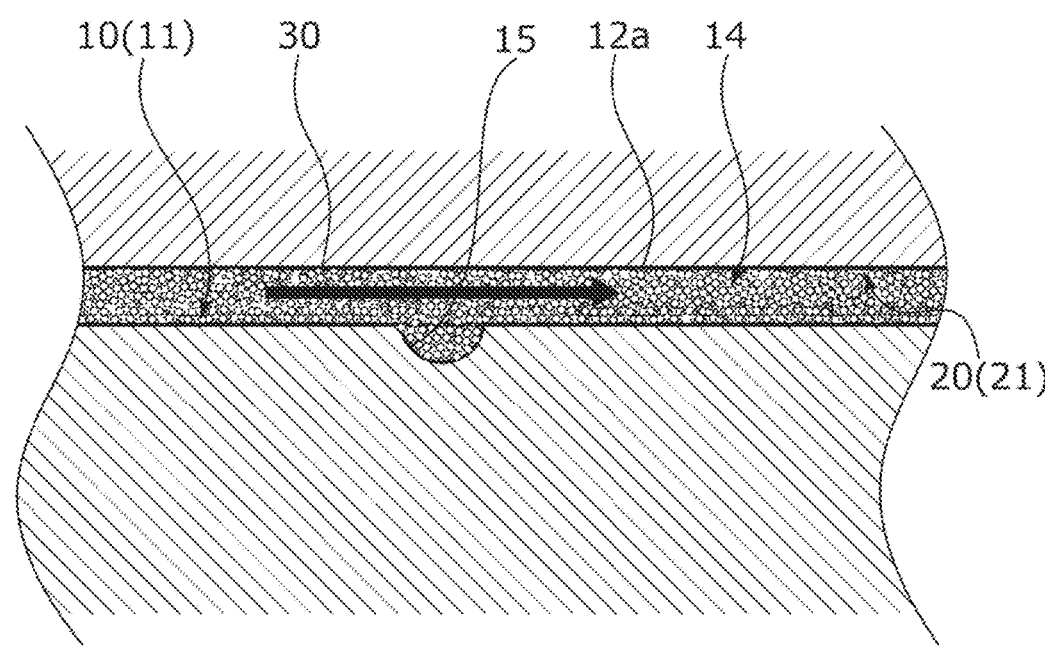

When the normal operation of the mechanical seal is performed for a long period of time, as illustrated in FIG. 8, the wear products 30 may be deposited in substantially the entirety of the recessed strip groove 14 due to the progress of wear of the land 12. In this state, since the layer of the wear products 30 deposited in the recessed strip groove 14 is more easily deformed upon the receipt of an external force than the land 12, a force received from the rotating seal ring 20 is mainly received by the land 12. In addition, since many voids exist between the wear products 30, a wide surface area thereof is secured, and the wear products 30 have SiC as a main component, the layer of the wear products 30 deposited in the recessed strip groove 14 can hold a large amount of the sealed fluid F. For these reasons, high lubricity between the sliding surfaces 11 and 21 can be maintained.

As described above, since the wear products 30 flowing along the recessed strip groove 14 are trapped and deposited by the dimples 15 provided on the recessed strip groove 14, the fine wear products 30 serving as a lubricant can be effectively retained in the recessed strip groove 14.

In addition, since the sealed fluid F can be held in the fine gaps between the wear products 30, lubricity between the sliding surfaces 11 and 21 is improved.

In addition, the plurality of recessed strip grooves 14 are independently provided in the radial direction. In other words, since the recessed strip grooves 14 are not in communication with a sealed fluid F side or an atmosphere A side which is an external space, the discharge of the wear products 30 from the recessed strip grooves 14 to the sealed fluid F side or the atmosphere A side can be suppressed. Therefore, the fine wear products 30 can be effectively retained in the recessed strip grooves 14.

Further, during relative rotation between the sliding surfaces 11 and 21, a positive pressure or negative pressure may occur in some of the recessed strip grooves 14. When a positive pressure or negative pressure has occurred in the recessed strip grooves 14, a force acts on the sliding surfaces 11 and 21 in a direction away from each other or in a direction toward each other, but the force acts evenly in the radial direction of the sliding surfaces 11 and 21, so that the sliding surfaces 11 and 21 are easily kept substantially parallel to each other.

In addition, since the recessed strip grooves 14 have an endless annular shape, the wear products 30 circulating around the recessed strip grooves 14 are easily trapped by the dimples 15. In addition, since the force caused by the recessed strip grooves 14 and acting in the direction in which the sliding surfaces 11 and 21 move away from or approach each other acts evenly in the circumferential direction of the sliding surfaces 11 and 21, the sliding surfaces 11 and 21 are easily kept substantially parallel to each other. In addition, since circumferential end portions are not formed in the recessed strip grooves 14, the wear products 30 can be prevented from being concentrated and deposited at the end portions.

In addition, since the bottom portions 14a of the recessed strip grooves 14 are curved in the recess direction, namely, in the direction opposite to the end surfaces of the lands 12, the wear products 30 moving along the recessed strip grooves 14 are guided toward the dimples 15 by the bottom portions 14a.

In addition, since the plurality of dimples 15 are evenly disposed in the longitudinal direction of the recessed strip grooves 14, the wear products 30 can be deposited in a well-balanced manner by being dispersed in the longitudinal direction of the recessed strip grooves 14. In addition, since the dimples 15 are spaced apart from each other in the circumferential direction, wear sections in which the wear products 30 are generated can be secured on the sliding surfaces 11 and 21.

In addition, steps for trapping the wear products 30 are configured such that the dimples 15 are provided on the bottom portions 14a of the recessed strip grooves 14 and the surfaces on the downstream side of the relative rotation, which form the dimples 15, trap the wear products 30. According to this configuration, since the dimples 15 are recessed portions that are recessed in a depth direction from the bottom portions 14a of the recessed strip grooves 14, a large space for accommodating the fine wear products 30 can be secured. In addition, since the shape is simple, the dimples 15 can be easily formed.

In addition, since the dimples 15 have a circular shape when viewed in the axial direction and no corner portions are formed, the wear products 30 are easily trapped in the dimples 15 in a well-balanced manner.

In addition, the stationary seal ring 10 is made of SiC, and the wear products 30 of SiC have high hydrophilicity. In addition, since the fine wear products 30 have a wide surface area, water can be suitably held around the recessed strip grooves 14 or the dimples 15, and lubricity can be enhanced.

Figure 9:
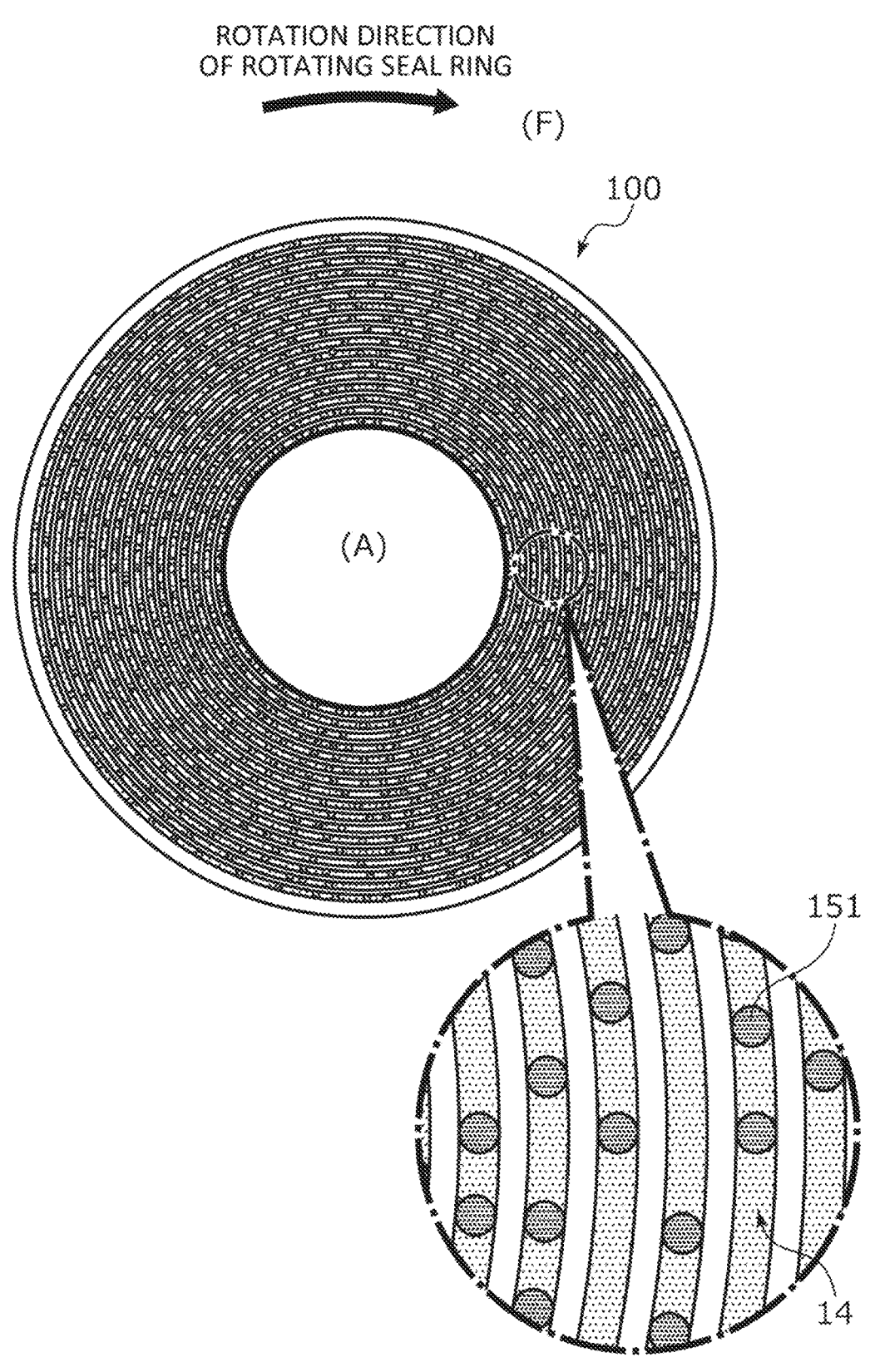
FIG. 9 is an explanatory view illustrating a stationary seal ring in a first modification example of the first embodiment.

In addition, in the first embodiment, a mode in which the dimples 15 are disposed to be scattered radially from the relative rotation center O of the sliding surface 11 when viewed in the axial direction has been provided as an example; however, the present invention is not limited thereto, and for example, as in the case of a stationary seal ring 100 of a first modification example illustrated in FIG. 9, dimples 151 may be randomly formed to be non-evenly disposed in the longitudinal direction of the recessed strip grooves 14.

Figure 10:
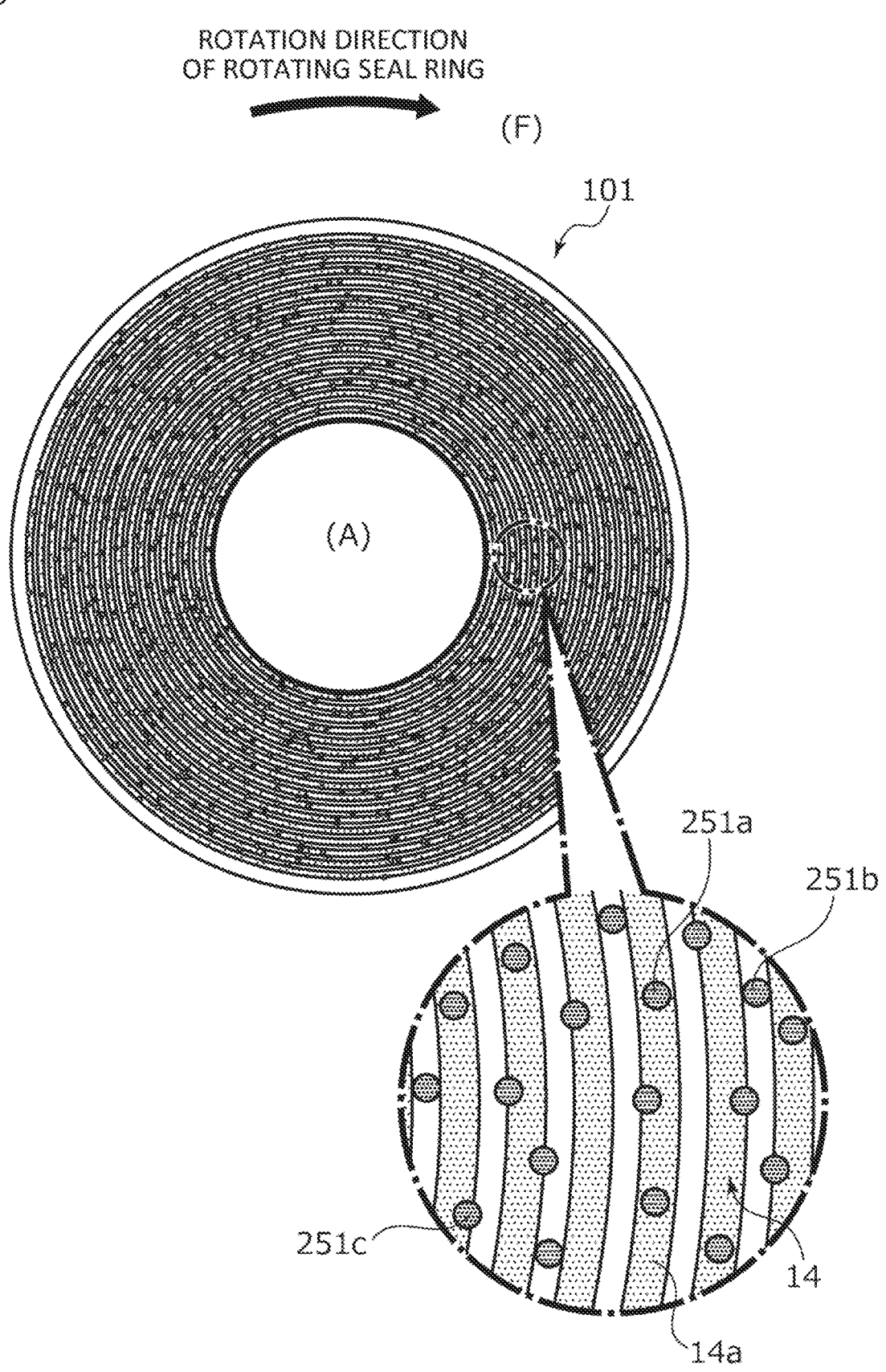
FIG. 10 is an explanatory view illustrating a stationary seal ring in a second modification example of the first embodiment.

In addition, in the first embodiment, a mode in which the dimples 15 are disposed only in the recessed strip grooves 14 has been provided as an example; however, the present invention is not limited thereto, and the dimples may include at least dimples disposed in the recessed strip grooves 14, or may be disposed across the lands 12 and the recessed strip grooves 14. For example, as in the case of a stationary seal ring 101 of a second modification example illustrated in FIG. 10, dimples 251a provided on the bottom portions 14a of the recessed strip grooves 14, dimples 251b provided on the lands 12, and dimples 251c provided across the recessed strip groove 14 and the lands 12 may be formed.

Incidentally, although not illustrated, the dimples may be provided to be scattered in a grid pattern on the sliding surface.

Figure 11:
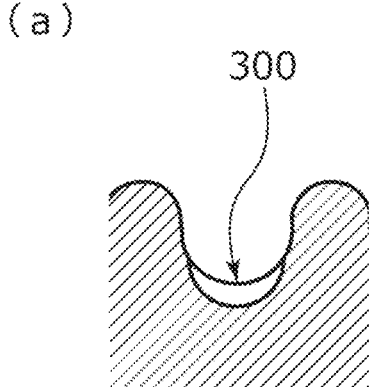
FIGS. 11A to 11D are explanatory views illustrating dimples in third to sixth modification examples of the first embodiment.
Figure 11:
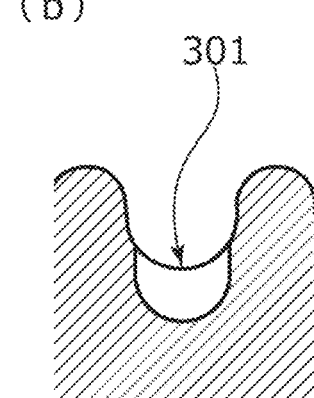
Figure 11:
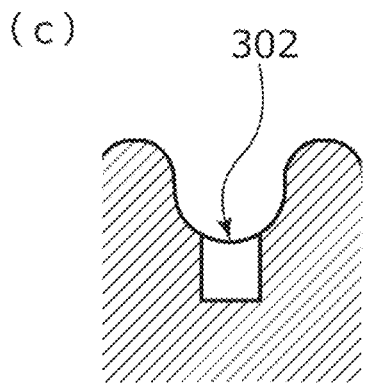
Figure 11:
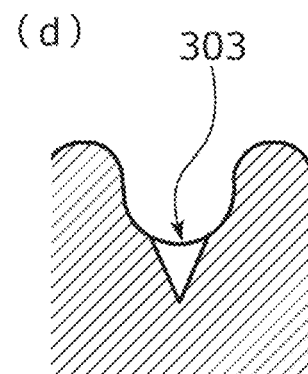
Figure 12:
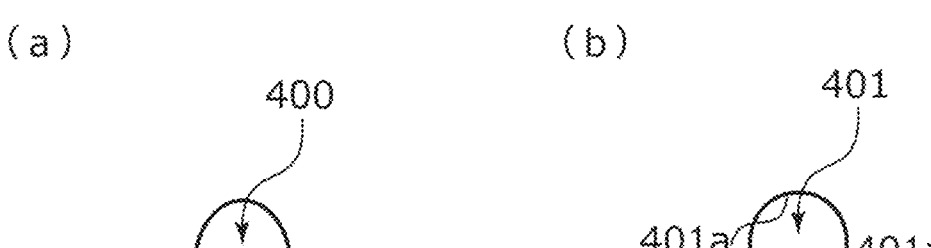
FIGS. 12A to 12F are explanatory views illustrating dimples in seventh to twelfth modification examples of the first embodiment.
Figure 12:
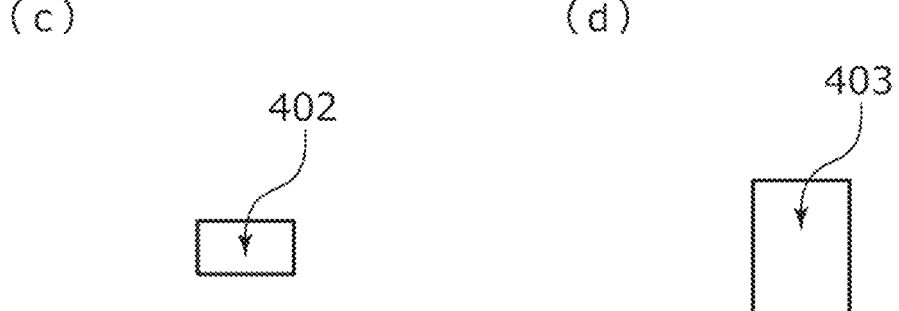
Figure 12:
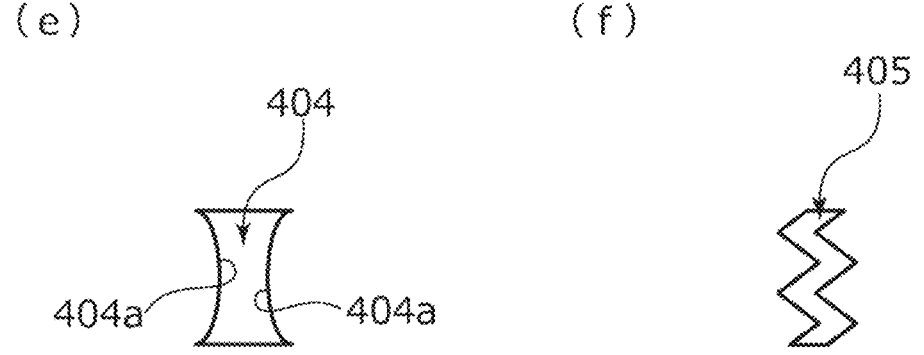

In addition, in the first embodiment, a mode in which the dimple 15 has a hemispherical shape that is curved in the recess direction in a cross-sectional view has been provided as an example; however, the present invention is not limited thereto. Incidentally, in FIGS. 11 and 12, an up-down direction of the drawing sheets and a left-right direction of the drawing sheets will be described as the circumferential direction and the radial direction, respectively.

For example, as in the case of a dimple 300 of a third modification example illustrated in FIG. 11A, the dimple may have a crescent shape in a cross-sectional view which is shallower than the dimple 15 of the first embodiment.

In addition, for example, as in the case of a dimple 301 of a fourth modification example illustrated in FIG. 11B, the dimple may have a U-shape in a cross-sectional view.

In addition, for example, as in the case of a dimple 302 of a fifth modification example illustrated in FIG. 11C, the dimple may have a rectangular shape in a cross-sectional view.

In addition, for example, as in the case of a dimple 303 of a sixth modification example illustrated in FIG. 11D, the dimple may have a triangular shape in a cross-sectional view.

In addition, in the first embodiment, a mode in which the dimple 15 has a circular shape when viewed in the axial direction has been provided as an example; however, the present invention is not limited thereto. For example, as in the case of a dimple 400 of a seventh modification example illustrated in FIG. 12A, the dimple may have an elliptical shape when viewed in the axial direction. Incidentally, the dimple 400 may have an elliptical shape that is long in the circumferential direction, or may be an elliptical shape that is long in the radial direction.

In addition, for example, as in the case of a dimple 401 of an eighth modification example illustrated in FIG. 12B, the dimple may have a long hole shape having curved surfaces 401a, which bulge to the outside of the dimple 401, at both ends in the longitudinal direction when viewed in the axial direction. Incidentally, the dimple 401 may be long in the circumferential direction, or may be long in the radial direction. Furthermore, the curved surfaces 401a may be formed to bulge to the inside of the dimple 401.

In addition, for example, as in the case of a dimple 402 of a ninth modification example illustrated in FIG. 12C, the dimple may have an oblong shape that is long in the radial direction when viewed in the axial direction.

In addition, for example, as in the case of a dimple 403 of a tenth modification example illustrated in FIG. 12D, the dimple may have an oblong shape that is long in the circumferential direction when viewed in the axial direction. Incidentally, although not illustrated, the dimple may have a square shape when viewed in the axial direction.

In addition, for example, as in the case of a dimple 404 of an eleventh modification example illustrated in FIG. 12E, the dimple may have a long hole shape having curved surfaces 404a, which bulge to the inside of the dimple 404, at both ends in a traverse direction when viewed in the axial direction. Incidentally, the dimple 404 may be long in the circumferential direction, or may be long in the radial direction. Furthermore, the curved surfaces 404a may be formed to bulge to the outside of the dimple 404.

In addition, for example, as in the case of a dimple 405 of a twelfth modification example illustrated in FIG. 12F, the dimple may be formed in a zigzag shape when viewed in the axial direction. Incidentally, corner portions of the dimple 405 may be curved.

Second Embodiment

Next, a sliding component according to a second embodiment of the present invention will be described with reference to FIG. 13. Incidentally, the description of configurations that are the same as and overlap with the configurations of the first embodiment will be omitted.

Figure 13:
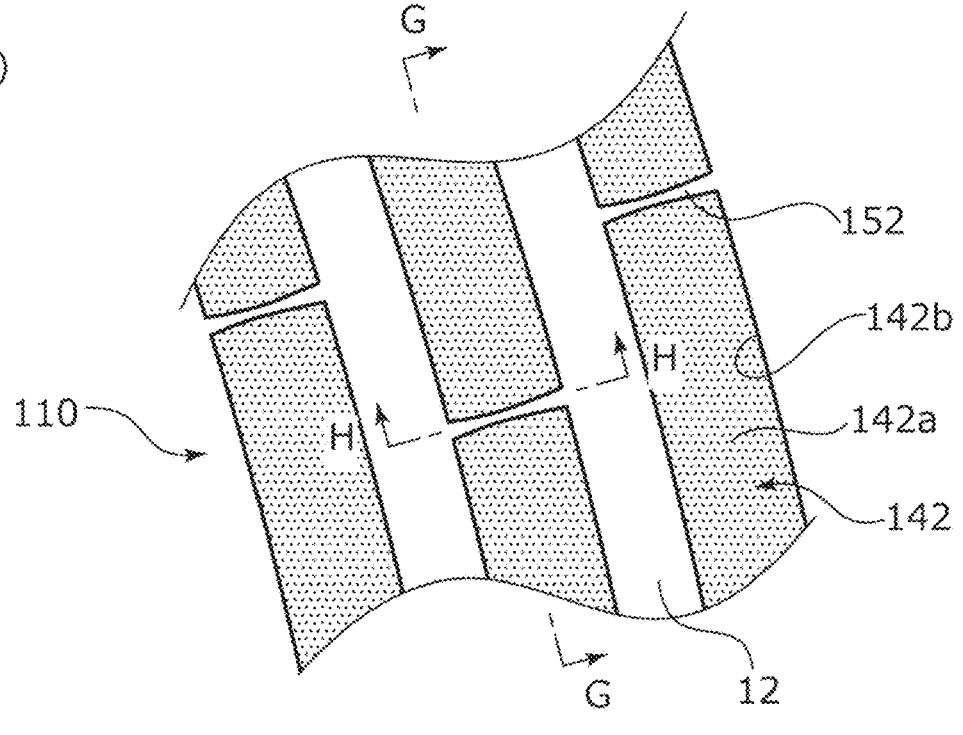
FIG. 13A is a schematic view of a recessed groove of a sliding component according to a second embodiment of the present invention when viewed in the axial direction.
FIG. 13B is a cross-sectional view taken along line G-G of FIG. 13A.
FIG. 13C is a cross-sectional view taken along line H-H of FIG. 13A.
Figure 13:
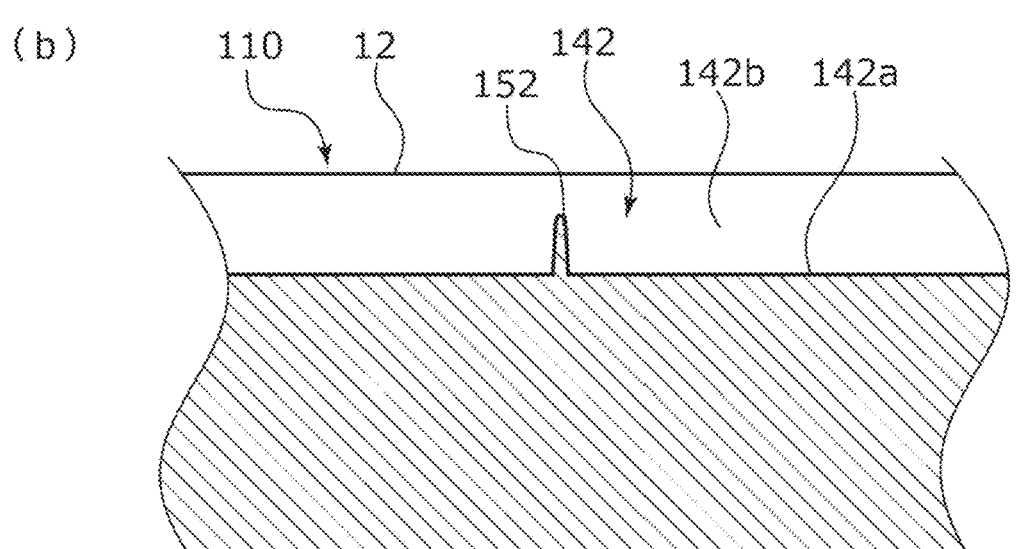
Figure 13:
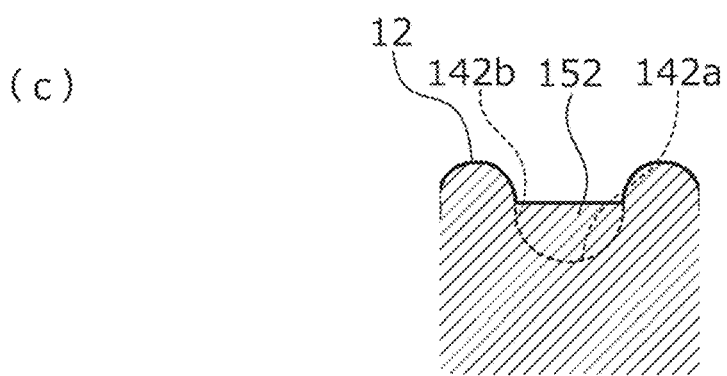

As illustrated in FIG. 13, in a stationary seal ring 110 as the sliding component according to the second embodiment of the present embodiment, a wall portion 152 is erected from a bottom portion 142a of a recessed strip groove 142 across side portions 142b of the recessed strip groove 142, namely, side surfaces of the lands 12. The wall portion 152 has a height dimension smaller than a height dimension of the land 12.

Since the wall portion 152 traps the wear products 30 moving along the recessed strip groove 142, the wear products 30 can be effectively retained in the recessed strip groove 142. Namely, the wall portion 152 functions as a step for trapping wear products.

Incidentally, the wall portion 152 is not limited to being formed from the bottom portion 142a of the recessed strip groove 142 across the side portions 142b of the recessed strip groove 142, and for example, the wall portion may rise from the bottom portion of the recessed strip groove while being spaced apart from the side portions of the recessed strip groove. Namely, the wall portion may be a step capable of trapping wear products.

Third Embodiment

Next, a sliding component according to a third embodiment of the present invention will be described with reference to FIGS. 14 and 15. Incidentally, the description of configurations that are the same as and overlap with the configurations of the first embodiment will be omitted.

Figure 14:
FIG. 14 is an explanatory view illustrating a stationary seal ring as a sliding component according to a third embodiment of the present invention.
Figure 15:
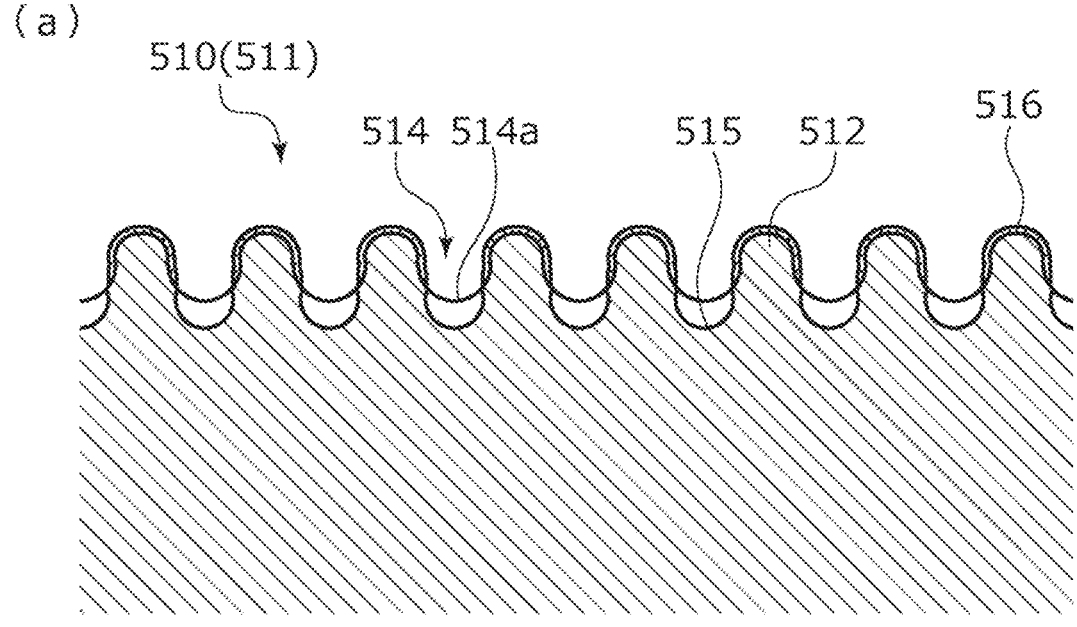
FIG. 15A is a cross-sectional view taken along line K-K of FIG. 14.
FIG. 15B is a cross-sectional view taken along line L-L of FIG. 14.
Figure 15:
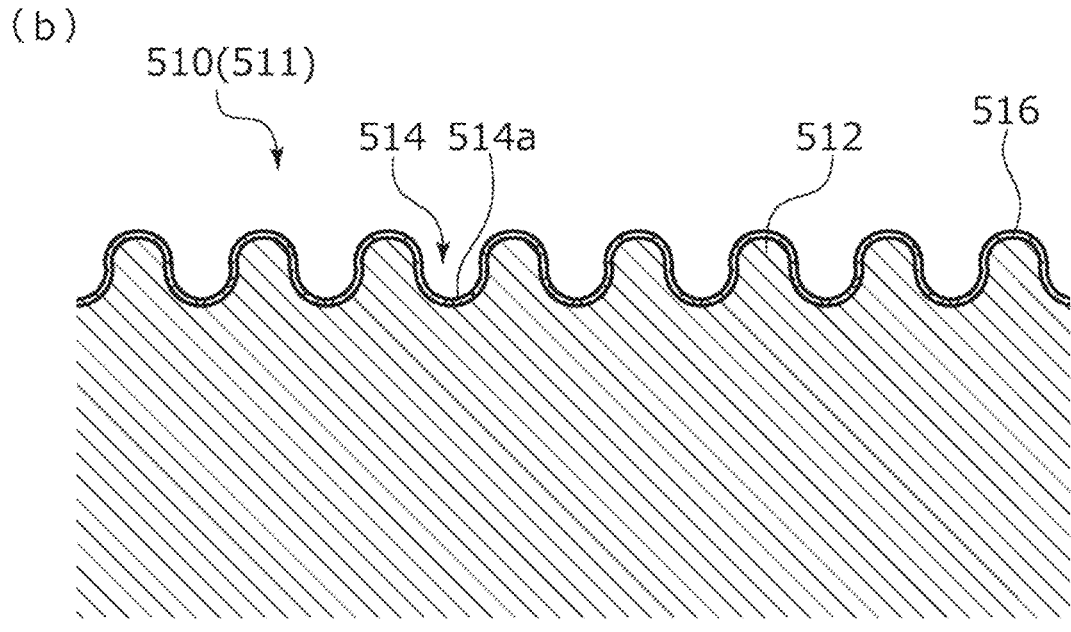

As illustrated in FIGS. 14, 15A, and 15B, a plurality of recessed strip grooves 514 having a uniform depth are provided on a sliding surface 511 of a stationary seal ring 510 of the present embodiment. Portions of the sliding surface 511 other than the recessed strip grooves 514 are lands 512 having a uniform height.

Specifically, one recessed strip groove 514 extends in the radial direction to obliquely pass through the relative rotation center O of the 511 when viewed in the axial direction. The other recessed strip grooves 514 extend substantially parallel to the one recessed strip groove 514, and are formed spaced apart from each other at a predetermined pitch width. Namely, each recessed strip groove 514 extends in a direction intersecting the axial direction. In other words, each recessed strip groove 514 extends to be inclined with respect to the circumferential direction of the sliding surface 511.

In addition, the recessed strip grooves 514 are formed by laser-processing the surface of the base material of the stationary seal ring 510. When laser processing is performed, an amorphous layer 516 is formed on the surface. The amorphous layer 516 is easily peeled off. Namely, the sliding surface 511 easily generates wear products. Incidentally, in the first and second embodiments, by forming the recessed strip grooves 14 and 142 through laser processing, the sliding surface 511 is allowed to easily generate wear products.

As illustrated in FIGS. 14 and 15A, a plurality of dimples 515 are evenly disposed on a bottom portion 514a of each recessed strip groove 514 while being spaced apart from each other in a longitudinal direction of the recessed strip groove 514. The dimples 515 are disposed radially from the relative rotation center O of the sliding surface 511 when viewed in the axial direction. Incidentally, the dimples may be randomly disposed, may be radially disposed, or may be disposed in a grid pattern.

When the rotating seal ring 20 rotates relative to the stationary seal ring 510, wear products flow along the recessed strip grooves 514, and are accumulated on the dimples 515 and the bottom portions 514*a*. The wear products of SiC have high hydrophilicity, so that the accumulated wear products can suitably hold water and lubricity can be enhanced.

Incidentally, in the third embodiment, one recessed strip groove 514 extends in the radial direction to obliquely pass through the relative rotation center O of the sliding surface 511 when viewed in the axial direction, and the other recessed strip grooves 514 extend substantially parallel to the one recessed strip groove 514, and are formed spaced apart from each other at the predetermined pitch width; however, for example, in addition to the above-described recessed strip grooves 514 (the one recessed strip groove 514 and the other recessed strip grooves 514), a plurality of other recessed strip grooves 514 may be provided to intersect the above-described recessed strip grooves 514, and the recessed strip grooves 514 may be orthogonal to each other, or the recessed strip grooves 514 may simply intersect each other without being orthogonal to each other.

Incidentally, in the third embodiment, a mode in which the dimples 515 are formed in the recessed strip grooves 514 has been provided as an example; however, for example, as in the second modification example (refer to FIG. 10), the dimples 515 may be provided across the land or the recessed strip groove and the land.

The embodiments of the present invention have been described above with reference to the drawings; however, the specific configurations are not limited to the embodiments, and changes or additions that are made without departing from the scope of the present invention are included in the present invention.

For example, in the first to third embodiments, a mode in which the plurality of recessed grooves are independently provided has been provided as an example; however, at least one recessed groove may be provided. In addition, some of the recessed grooves of the first and second embodiments may communicate with an external space on the radially outer side or an external space on the radially inner side, and the recessed grooves of the third embodiment may not communicate with the external space on the radially outer side or the external space on the radially inner side.

In addition, in the first and second embodiments, a mode in which the recessed grooves have an endless annular shape has been provided as an example, and in the third embodiment, a mode in which the recessed grooves extend in the direction intersecting the axial direction has been provided as an example; however, for example, the recessed grooves may be grooves extending in the circumferential direction, grooves extending in the radial direction, or grooves having a component extending in the radial direction and a component extending in the circumferential direction.

In addition, in the first and second embodiments, a mode in which the depth of the recessed strip portions is constant in the circumferential direction has been provided as an example, and in the third embodiment, a mode in which the depth of the recessed strip portions is constant in the longitudinal direction has been provided as an example; however, for example, the bottom portion of each recessed strip portion may have a tapered shape such that a part of the bottom portion becomes shallower or deeper as the bottom portion extends toward one side in the relative rotation direction.

In addition, in the first to third embodiments, a mechanical seal for automobiles has been described as an example of the sliding components; however, the present invention may be applied to other mechanical seals for general industrial machines, water pumps, or the like. In addition, the present invention is not limited to the mechanical seal, and may be applied to sliding components other than the mechanical seal, such as a slide bearing.

In addition, in the first to third embodiments, an example in which the recessed strip grooves are provided only on the stationary seal ring has been described; however, the recessed strip grooves may be provided only on the rotating seal ring, or may be provided on both the stationary seal ring and the rotating seal ring.

In addition, in the first to third embodiments, the sealed fluid side and the leakage side have been described as a high-pressure side and a low-pressure side, respectively; however, the sealed fluid side and the leakage side may be a low-pressure side and a high-pressure side, respectively, or the sealed fluid side and the leakage side may have substantially the same pressure.

In addition, in the first to third embodiments, a mode in which the mechanical seal is an inside mechanical seal that seals the sealed fluid F tending to leak from the radially outer side toward the radially inner side of the sliding surfaces has been provided as an example; however, the present invention is not limited thereto, and the mechanical seal may be an outside mechanical seal that seals the sealed fluid F tending to leak from the radially inner side toward the radially outer side of the sliding surfaces.

In addition, in the first to third embodiments, a mode in which the sealed fluid F is cooling water has been provided as an example; however, the present invention is not limited thereto, the sealed fluid may be a liquid or a mist mixture of a liquid and a gas, and for example, may be lubricating oil or the like.

REFERENCE SIGNS LIST

10 Stationary seal ring (sliding component)
11 Sliding surface
12 Land
12*a* Top portion
14 Recessed strip groove (recessed strip portion)
14*a* Bottom portion
15 Dimple (step)
16 Plateau layer
20 Rotating seal ring
21 Sliding surface
30 Wear product
100 Stationary seal ring
110 Stationary seal ring
142 Recessed strip groove
142*a* Bottom portion
142*b* Side portion
151 Dimple
152 Wall portion
A Atmosphere
C Upward facing cross section
E Sealed fluid
Fa Sealed fluid
L1 Width dimension
L10 Dimension
L10' Dimension
L10" Dimension
L2 Width dimension
L3 Radial dimension
L4 Depth dimension
L5 Depth dimension

The invention claimed is:

1. A sliding component for being disposed at a location of relative rotation of a rotating machine and sliding relative to a counterpart sliding member, wherein the sliding component comprises a recessed groove portion is formed on a sliding surface of the sliding component, wherein the recessed groove portion is provided with a step having a difference in height, which is configured to trap a wear product, wherein the recessed groove portion has an endless annular shape, and wherein the step is formed by a dimple which is disposed on a bottom portion of the recessed groove portion and having a bottom surface, or a wall portion which is erected from the bottom portion of the recessed groove portion.

2. The sliding component according to claim 1, wherein a plurality of the recessed groove portions are independently provided in a radial direction.

3. The sliding component according to claim 1, wherein a bottom portion of the recessed groove portion is curved to be further recessed in a recess direction of the recessed groove portion.

4. The sliding component according to claim 1, wherein a plurality of the steps are disposed spaced apart from each other in a longitudinal direction of the recessed strip portion.

5. The sliding component according to claim 1, wherein the sliding component is made of SiC.

6. The sliding component according to claim 2, wherein a dimple is disposed on a bottom portion of the recessed groove portion, and a part of the dimple forms the step.

7. The sliding component according to claim 6, wherein the dimple has a circular shape when viewed in an axial direction.

8. The sliding component according to claim 3, wherein a dimple is disposed on a bottom portion of the recessed groove portion, and a part of the dimple forms the step.

9. The sliding component according to claim 8, wherein the dimple has a circular shape when viewed in an axial direction.

10. The sliding component according to claim 4, wherein a dimple is disposed on a bottom portion of the recessed groove portion, and a part of the dimple forms the step.

11. The sliding component according to claim 10, wherein the dimple has a circular shape when viewed in an axial direction.

* * * * *